United States Patent Office 3,269,208
Patented August 30, 1966

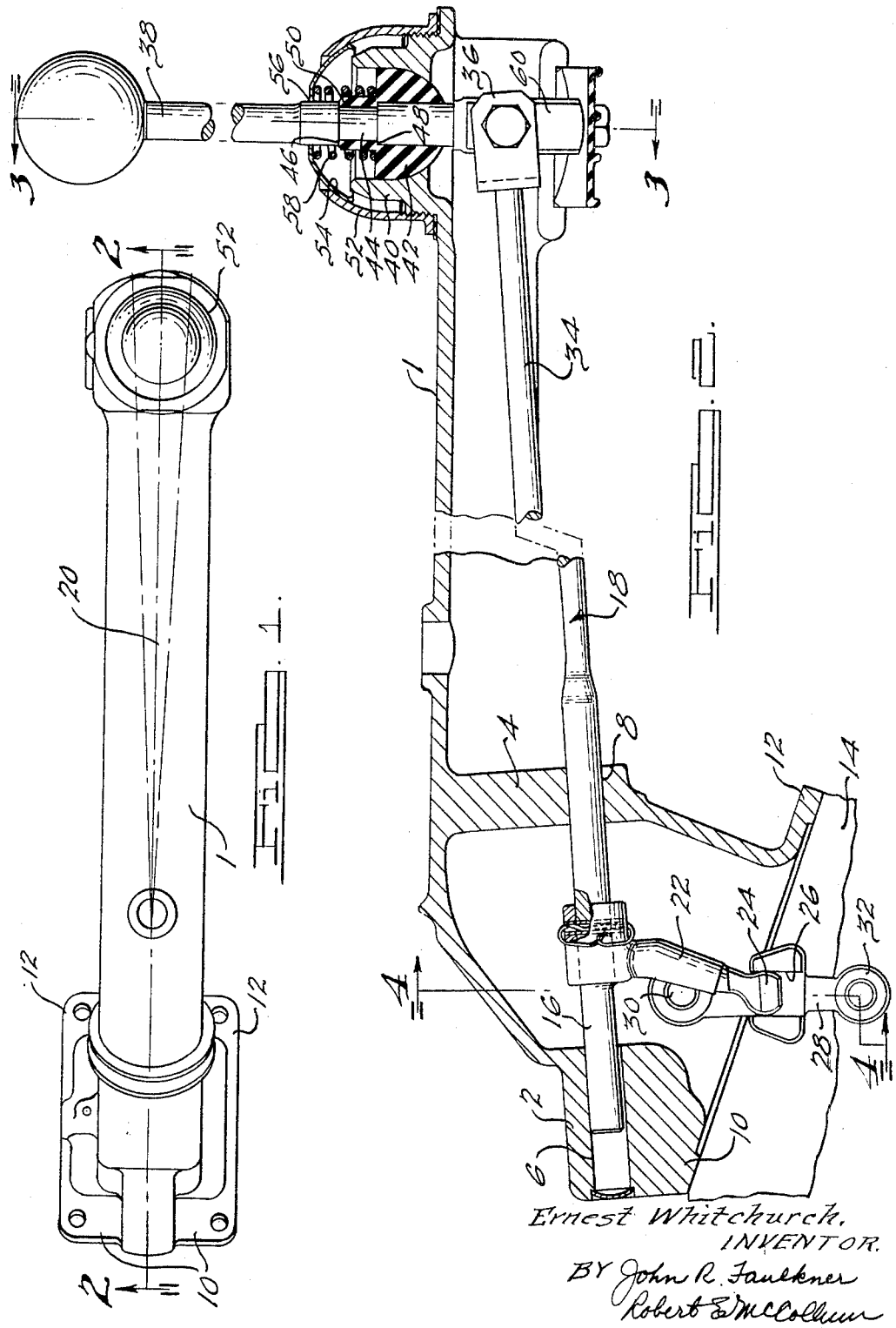

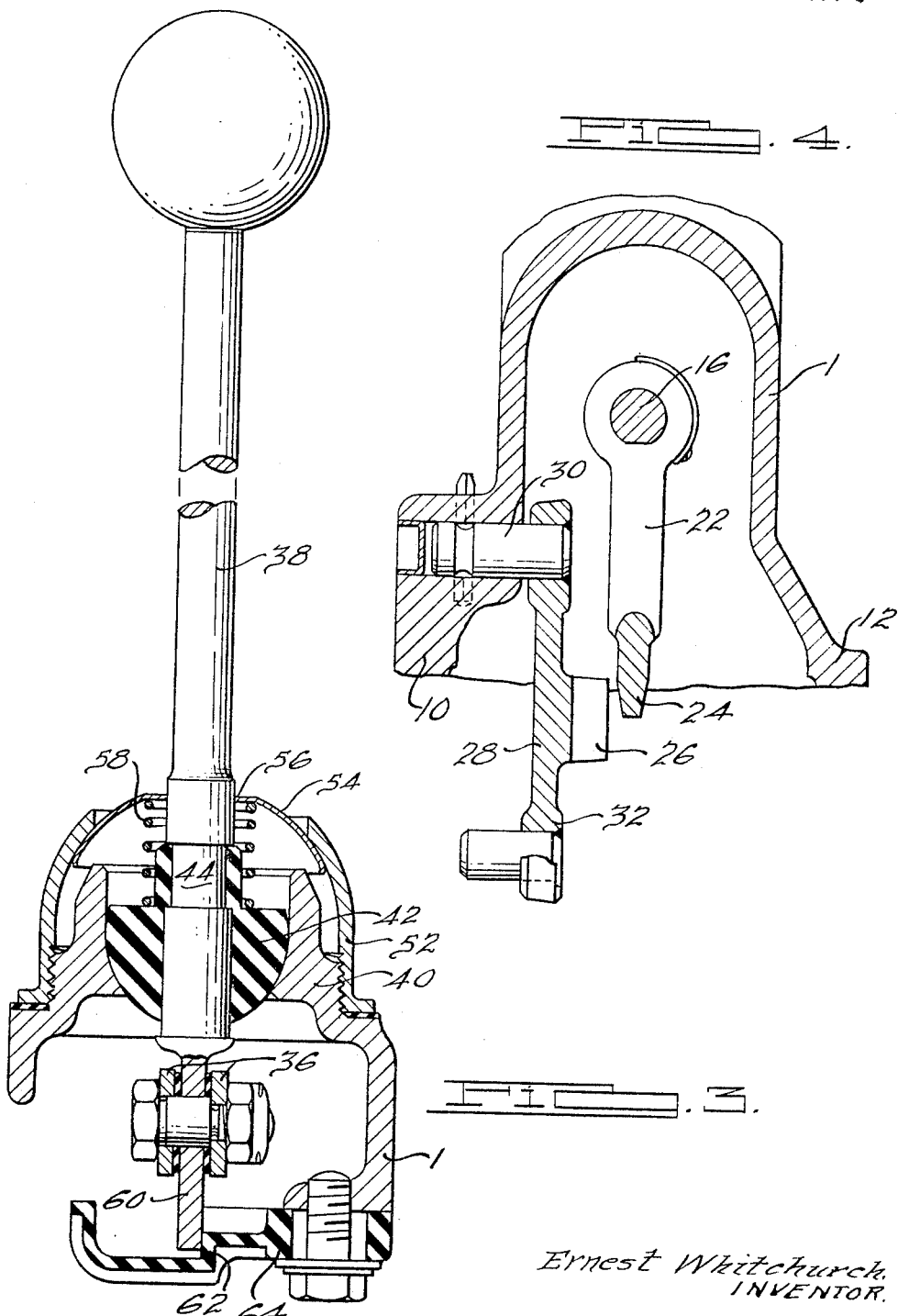

3,269,208
GEARSHIFT CONTROL LINKAGE
Ernest Whitchurch, Hornchurch, Essex, England, assignor to Ford Motor Company, Dearborn, Mich., a corporation of Delaware
Filed Dec. 23, 1963, Ser. No. 332,788
Claims priority, application Great Britain, Jan. 18, 1963, 2,300/63
8 Claims. (Cl. 74—473)

This invention relates to a motor vehicle gearshift control linkage. More particularly, it relates to one in which the movement of an operator controlled gearshift lever rotates and axially slides a gear ratio selecting and establishing member. Lateral movement of the lever to opposite sides of a central or neutral gear range position rotates a shift rod to move the selector member into engagement with a particular shift fork or lever; subsequent forward or backward movement of the lever moves the shift rod axially to move the fork or lever to engage a gear.

The above-described construction is known; however, in the past, the shift rod generally has been formed in two pivotally connected parts. The forward part, to which the selector member was fixed, was slidable and rotatable in axially aligned bearings, which prevented lateral displacement of the rod. The shift fork or rod selector member, therefore, had a movement in two planes only, at right angles to each other. The end of the gearshift lever, however, when it was moved sideways or laterally to initially rotate the shift rod, moved the rearward end of the rod in an arc to either side of the rod longitudinal axis. To permit this movement, the gearshift lever connected rear portion of the shift rod was pivotally connected to the front rod portion. Thus, as the lever was moved arcuately sideways, it not only rotated the two rod parts, but the parts pivoted relative to each other. The pivotal connection, however, greatly increased the cost of the assembly.

The invention eliminates the above disadvantage by providing a resilient one-piece shift rod that has one of its ends, axially and rotatably movable, but held against lateral displacement, while the opposite end has a limited pivotal connection to the shift lever. When the gearshift lever is rocked arcuately in a lateral direction to engage a particular shift fork or lever, the rear portion of the shift rod bends and rotates to follow the gearshift lever movement. Upon release of the gearshift lever, the natural resiliency of the bent portion of the shift rod tends to return the lever to its original or neutral position.

Preferably, the portion of the shift rod fixed against lateral displacement is of one diameter, and the flexible portion connected to the gearshift lever is of a smaller diameter. The bending of the rod generally occurs at the joint between the two diameters, which is positioned between the gearshift lever and the bearings.

One of the objects of the invention, therefore, is to provide a gearshift control linkage including a resilient rod connecting an operator controlled gearshift lever and a gear ratio selecting member.

It is a further object of the invention to provide a gearshift control linkage including a one-piece resilient shift rod between an operator controlled gearshift lever and a gear ratio selecting member, the shift rod being bendable from its normal longitudinal axis to effect its rotation upon a predetermined movement of the gearshift lever.

It is a still further object of the invention to provide a gearshift control linkage having a one-piece resilient shift rod for rotatably and axially sliding a gear ratio selector member upon arcuate movements of the gearshift lever substantially in corresponding directions; the shift rod consisting of one rotatable and axially movable portion fixed against lateral displacement and integral with a smaller diameter portion bendable from the rod longitudinal axis to translate a lateral arcuate movement of the gearshift lever into a rotation of the gear ratio selecting member.

Other objects, features, and advantages of the invention will become apparent upon reference to the succeeding detailed description thereof, and to the drawings which are essentially to scale and illustrate the preferred embodiment thereof; wherein:

FIGURE 1 is a plan view of a gearshift linkage assembly embodying the invention, FIGURE 2 is a cross-sectional view taken on a plane indicated by and viewed in the direction of the arrows 2—2 of FIGURE 1, and FIGURES 3 and 4 are cross-sectional views taken on planes indicated by and viewed in the direction of arrows 3—3 and 4—4, respectively, of FIGURE 2.

The figures show a gearshift assembly contained in a one-piece housing 1 having a generally inverted U-shaped cross section (FIGURE 4). In its preferred installation, it extends longitudinally in a motor vehicle. At its front end (left-hand portion of FIGURE 2), the casing has axially spaced casing members 2 and 4 suitably bored to define bearing portions 6 and 8. The lower portions of members 2 and 4 have apertured flanges 10 and 12 which are bolted or otherwise secured to and close the open end of a conventional multispeed gearbox 14.

The relatively rigid portion 16 of a one-piece resilient rod 18 is axially slidably and rotatably mounted in the spaced bearing portions 6 and 8. The bearing portions thus prevent lateral displacement of the longitudinal axis 20 of the rod portion. A gear selector member 22 is rigidly fixed to this portion of the rod between the bearings 6 and 8 for rotation and axial movement with the rod. It has an end part 24 adapted to be rotated into or out of engagement with the pocket 26 of a reverse gear lever 28, upon rotation of shift rod 18. The lever 28 is pivotally mounted at its upper point for rotation about a fixed pin 30 (FIGURE 4) secured in the housing. At its lower end 32 the lever is pivotally connected to suitable linkage (not shown) that actuates a reverse gearshift rod or fork (also not shown) upon rotation of the lever. This latter movement is effected by the subsequent axial movement of the shift rod 18, thereby sliding the engaged shift fork to engage reverse gear. For clarity, only the reverse gear selecting lever is shown; however, it will be clear that the yokes of the other levers normally provided would also be similarly positioned for engagement by the lever 22.

The rearward portion 34 of the shift rod 18 is of a smaller diameter than front portion 16 so as to be flexible. Thus, it can bend relative to the substantially fixed longitudinal axis 20 of portion 16. This flexible portion, at one end, has a fixed yoke or clevis 36 pivotally connected to the lower end of an operator controlled gearshift lever 38. This pivotal connection is a limited one, permitting angular relative movements of the longitudinal axes of the rod and lever, but preventing any rotation of the rod about its longitudinal axis relative to the lever.

The construction of the shift lever housing and mounting is as follows. The rear end of the housing 1 is formed with a part-spherical socket 40 rotatably receiving a part-spherical ball 42 fixed on the floor gearshift lever 38. The lever has a part 44 of reduced diameter providing shoulders 46 and 48 between which is seated a cylindrical extension 50 of ball 42. The extension fixes the ball for an axial movement with the lever 38. The socket 40 is closed by a two-piece cap consisting of an outer semi-spherical part 52, threadedly connected to the housing 1, and an inner semi-spherical cover part 54.

The cover 54 is telescopically slidable within the part 52, and has an aperture 56 through which the lever 38 slidably extends. A compression spring 58 is seated between the cover 54 and the top of the ball 42 to continuously bias the later against the socket 40.

The ball 42 and socket 40 form a universal mounting for the lever 38. When the upper end of the lever is swung arcuately either forwardly or backwardly (to the left or right in FIGURE 2), the lower end of the lever is swung in an opposite direction. When the upper end of the lever is arcuately swung sidewards in either direction (perpendicular to the plane of the paper in FIGURE 2, or to the left or right as seen in FIGURE 3), the lower end of the lever is similarly swung in an opposite direction.

In the central position shown, the gear selector member is engaged with the yoke (not shown) of a first-to-second speed gear lever (not shown), so that upon forward or backward movement of the shift lever, first or second speed may be established. Swinging of the lever 38 to the right side of the central position shown in FIGURE 3 causes a third or fourth gearshift rod (not shown) to be engaged so that subsequent forward or rearward swinging of the lever 38 axially moves the gearshift rod 18 to establish third or fourth speed drive. Swinging of the lever 38 laterally to the other or left side enables reverse gear to be engaged upon rearward movement of the lever.

Inadvertent sidewards rocking of the lever 38 into a position in which reverse gear can be engaged is prevented by the lower end 60 of the lever engaging a step 62 on a guide member 64 fixed to the base of housing 1. The lever can be moved clear of the step 62 by pulling it up or along its axis, compressing the coil spring 58. When this has been done, the lever can be swung sidewards into the position in which rearward movement of the lever engages reverse gear.

The operation of the gearshifting linkage described is believed to be clear from the above description and from a consideration of the drawing. In brief, when the shift lever 38 is lifted to clear step 62 and arcuately moved to the left of the position shown in FIGURE 3, the pivotal connection of the rod 18 to the lower end 60 of the lever moves the end of the rod to the right and out of alignment with the longitudinal axis 20 of the bearings. The resilient rear rod part 34 therefore bends relative to the thicker front part 16, and the rod is rotated. Lever 22 thus rotates to engage reverse lever 28, and subsequent axial movement of rod 18, by arcuate movement of lever 38 forwardly (to the left of the position shown in FIGURE 2) will rotate lever 28 and move the reverse shift fork or rod connected to it. A reverse gear will then have been engaged, and the desired gear ratio established. After reverse gear has been disengaged, by the return rightward movement (FIGURE 2) of lever 38 to the central position shown, the natural resiliency of rod portion 34 will rotate the selector member 22 out of engagement with the reverse lever 28 and return the shift lever 38 to the central position shown. It can then be moved to establish another gear ratio.

While the invention has been illustrated in its preferred embodiment, it will be clear to those skilled in the arts to which the invention pertains that many changes and modifications may be made thereto without departing from the scope of the invention.

I claim:

1. A movement control linkage including a lever, means mounting said lever for an arcuate movement of one end, a flexible longitudinally extending connecting member, means mounting one portion of said member for a rotational movement while preventing lateral movements, means connecting another portion of said member to the end of said lever for movement with said lever, and an actuating element fixed to said one end of said member for movement with said member, arcuate movement of said lever in one direction rotating and arcuately bending said another portion laterally of its longitudinal axis to rotate said actuating element.

2. A transmission gearshifting mechanism including a first operator controlled shift lever, means mounting one end of said lever for an arcuate movement, a longitudinally extending shift member, means mounting one portion of said member for a rotational movement while preventing lateral movements, said member having a resilient bendable portion, means connecting said bendable portion to said one end of said lever preventing relative rotation therebetween in one direction, a gear ratio selector lever fixed to said shift member one portion for movement therewith, and a gearshift level engaged by said selector lever upon rotation of said selector lever in one direction, arcuate movement of said first shift lever end in said one direction effecting a rotation of said selector lever into engagement with said gearshift lever by the bending and rotation of said resilient portion.

3. A transmission gearshifting mechanism including a first operator controlled shift lever, means mounting said lever for a universal movement about a fixed pivot spaced from one end to permit arcuate swinging of said end, a shift rod, means mounting one portion of said rod for rotational and axial movements while preventing lateral movement, said rod having a resilient bendable portion, means pivotally connecting said bendable portion to said one end of said gearshift lever for an axial movement of said rod while preventing relative rotation between said lever and rod in one direction, a gear selector lever fixed to said one portion of said shift rod for movement therewith, and a movable gearshift lever engaged by said selector lever upon rotation of said selector lever in one direction, arcuate movement of said operator controlled shift lever in said one direction effecting a rotation of said selector lever into engagement with said gearshift lever by the bending and rotation of said resilient portion, the subsequent pivotal movement of said first shift lever end relative to said bendable portion axially moving said rod and selector lever and gearshift lever.

4. A transmission gearshifting mechanism including a first operator controlled shift lever, means mounting one end of said lever for an arcuate movement, a longitudinally extending shift member, means mounting one portion of said member for a rotational movement while preventing lateral movements, said member having a resilient bendable portion, means connecting said bendable portion to said one end of said lever preventing relative rotation therebetween in one direction, a gear ratio selector lever fixed to said shift member one portion for movement therewith, and a gearshift lever engaged by said selector lever upon rotation of said selector lever in one direction, arcuate movement of said first shift lever end in said one direction from a first position effecting a rotation of said selector lever from a first position into engagement with said gearshift lever by the bending and rotation of said resilient portion, the resiliency of said bendable portion returning said lever and member to said first position upon release of said first shift lever.

5. A transmission gearshifting mechanism including a first operator controlled shift lever, means mounting one end of said lever for an arcuate movement, a shift rod, means mounting one portion of said rod for rotational movement while preventing lateral movement from its longitudinal axis, said rod having resilient bendable portion, means connecting said bendable portion to said one end of said gearshift lever preventing relative rotation therebetween in one direction, a gear selector lever fixed to said shift rod one portion for rotation therewith, and a gearshift lever engaged by said selector lever upon rotation of said selector lever in one direction, arcuate movement of said operator controlled shift lever in said one direction effecting a rotation of said selector lever into engagement with said gearshift lever by the bending and rotation of said resilient portion laterally of its longitudinal axis.

6. A transmission gearshift mechanism including a first operator controlled shift lever, means mounting one end of said lever for an arcuate movement, a one-piece shift rod having a rigid portion and a resilient bendable portion rotatable together, means mounting said rigid portion for rotational movement while preventing lateral movement from its longitudinal axis, means connecting said bendable portion to the end of said shift lever preventing relative rotation therebetween in one direction, a gear selector lever fixed to said shift rod one portion for rotation movement therewith, and a gearshift lever engaged by said selector lever upon rotation of said selector lever in one direction, arcuate movement of said first shift lever in said one direction by an arcuate bending and rotation of said resilient portion effecting a rotation of said selector lever into engagement with said gearshift lever.

7. A transmission gearshift mechanism including a first operator controlled shift lever, means mounting one end of said lever for an arcuate movement, a one-piece shift rod having a rigid portion and a resilient bendable portion of a smaller diameter rotatable together, means mounting said rigid portion for rotational movement while preventing lateral movement from its longitudinal axis, means connecting said bendable portion to the end of said shift lever preventing relative rotation therebetween in one direction, a gear selector lever fixed to said shift rod one portion for rotation movement therewith, and a gearshift lever engaged by said selector lever upon rotation of said selector lever in one direction, arcuate movement of said first shift lever in said one direction by an arcuate bending and rotation of said resilient portion effecting a rotation of said selector lever into engagement with said gearshift lever.

8. A transmission gearshifting mechanism including an operator controlled shift lever mounted for an arcuate swinging movement of one end, a one-piece shift rod extending longitudinally from said lever substantially at right angles thereto, said lever having an end arcuately movable laterally to either side of the rod's longitudinal axis, said rod having a rigid portion and a flexible portion of a smaller diameter integral therewith, means mounting the rigid portion of said rod for a rotational movement while preventing lateral movement, means connecting said flexible portion to said one end of said shift lever preventing relative rotation therebetween, and a gear selector lever fixed to said rigid portion for movement therewith, arcuate movement of said shift lever laterally of the normal longitudinal axis of said rod bending the said resilient portion out of alignment with the rod normal axis thereby rotating said rod and said selector lever.

No references cited.

MILTON KAUFMAN, *Primary Examiner.*